United States Patent
Rippolone (10) Patent No.: US 6,832,624 B1
(45) Date of Patent: Dec. 21, 2004

(54) PLUMBING TOOL AND METHOD FOR REPAIRING A PIPE THEREWITH

(75) Inventor: Joseph D. Rippolone, Grosse Pointe Farms, MI (US)

(73) Assignee: Waterfall, Inc., Detroit, MI (US)

( * ) Notice: Subject to any disclaimer, the term of this patent is extended or adjusted under 35 U.S.C. 154(b) by 0 days.

(21) Appl. No.: 10/680,915

(22) Filed: Oct. 8, 2003

(51) Int. Cl.[7] .................. F16K 43/00; F16L 55/105; F16L 55/11
(52) U.S. Cl. ............ 137/317; 137/15.11; 137/15.13; 137/318; 138/89; 138/94; 138/97
(58) Field of Search ................. 137/15.15, 315.01, 137/317, 318; 138/89, 90, 93, 97

(56) References Cited

U.S. PATENT DOCUMENTS

| | | | | |
|---|---|---|---|---|
| 402,600 | A | * 5/1889 | Kemp | 138/90 |
| 1,177,338 | A | * 3/1916 | Kayfetz | 138/90 |
| 2,974,685 | A | * 3/1961 | Ver Nooy | 138/90 |
| 3,114,395 | A | * 12/1963 | Immel | 138/97 |
| 3,457,959 | A | 7/1969 | Cooper | 138/94 |
| 4,589,446 | A | * 5/1986 | Allen | 138/97 |
| 5,152,311 | A | * 10/1992 | McCreary | 138/97 |
| 5,224,516 | A | * 7/1993 | McGovern et al. | 138/97 |
| 5,651,393 | A | * 7/1997 | Danowski | 138/97 |
| 6,508,267 | B1 | 1/2003 | Rippolone | 137/317 |

FOREIGN PATENT DOCUMENTS

FR          55156          10/1951

* cited by examiner

*Primary Examiner*—George L. Walton
(74) *Attorney, Agent, or Firm*—Carlson, Gaskey & Olds (57) ABSTRACT

A plumbing tool includes an elongated hollow shaft and a resilient member attached to the shaft adjacent a shaft end. The resilient member extends radially outward and is sized to closely fit within a pipe inner diameter. Once the pipe has been cut, the tool is forced into the pipe end and the resilient member closely fits within the pipe inner diameter to block fluid flow. As the shaft is hollow, fluid flow is diverted through the shaft. A valve is then passed over the tool to engage the pipe end. As the fluid is being diverted through the tool, the value is then soldered to the pipe without concern for the heat sink effect of fluid passage through the pipe. Once the valve has been properly soldered to the pipe end, the tool is simply pulled through the valve and removed. Capping of the pipe end with the valve is therefore rapidly achieved with minimal disruption to the users.

24 Claims, 7 Drawing Sheets

PLUMBING TOOL AND METHOD FOR REPAIRING A PIPE THEREWITH

BACKGROUND OF THE INVENTION

The present invention relates to a plumbing tool, and more particularly to a method and tool for diverting fluid within a cut pipe so that a fitting can be soldered to the cut pipe.

Soldering of pipe for the attachment of fittings in a plumbing system is a simple and effective procedure. However, such repairs cannot take place in the presence of water. Even very small quantities of water remaining in the pipe or running through the fitting during the soldering process can prevent the formation of a properly soldered joint. Such fluid flow is particularly problematic in a repair situation.

Typically, it is necessary to completely drain the plumbing system in which it is intended to add a fitting or to repair a broken pipe. In a household situation this is an inefficient but otherwise acceptable procedure because the amount of water involved in the pipes of the system is relatively small. Even in this household situation, however, small amounts of water can continue to run through the pipe even after the major amount of water has been fully drained.

In a major plumbing system, for example in an office building, it is most inconvenient to drain the system due to the large quantities of water involved and the interference with the normal working of the building.

One conventional method to minimize the time and inconvenience of making such a repair is through the usage of a plug. The system is at least partially drained and then the plug is inserted to block residual water flow. The plug is typically a water-soluble member which temporarily blocks the pipe until the repair is complete. After a period of time, the plug dissolves and the pipe is cleared for normal operation. Disadvantageously, this is a time consuming process as the system must be at least partially drained. In addition, the plug may not completely dissolve and may eventually damage the system.

Another conventional method is to use a removable plug. Disadvantageously, this method is difficult as a relatively large pressure may build-up behind the plug. Particularly in large systems, pressure build-up may even become a safety concern. Again, the system is usually at least partially drained prior to insertion of the plug to minimize pressure formation concerns.

Accordingly, it is desirable to provide a plumbing tool which provides for the timely soldering of a fitting to a pipe even in the presence of water.

SUMMARY OF THE INVENTION

The plumbing tool according to the present invention provides an elongated hollow shaft. A resilient member is attached to the shaft adjacent a shaft end. The resilient member extends radially outward and is sized to closely fit within a pipe inner diameter.

The resilient member is retained to the shaft by a pair of threaded fasteners. To minimize the possibility of damage to the resilient member, the threaded fasteners include rounded outer surfaces. That is, the threaded fasteners avoid sharp contours which may damage the resilient member. To further protect the resilient member, a spacer is located between each threaded fastener and the resilient member. Each spacer is an annular member which is manufactured of a non-metallic material.

As generally known, when a leak occurs the pipe is commonly cut to form an axial pipe end. The pipe, however, may still be a conduit for fluid leakage from a fluid source upstream of the cut pipe end. Moreover, the fluid may be under a pressure which may result in a considerable fluid flow from pipe end.

Once the pipe has been cut, the tool according to the present invention is forced into the pipe end and the resilient member closely fits within the pipe inner diameter to block fluid flow. As the shaft is hollow, fluid flow is diverted through the shaft. Pressure that may otherwise form upstream of the resilient member is thereby substantial alleviated.

Once the tool has been inserted into the pipe, fluid is redirected through the tool and away from the pipe inner diameter adjacent the pipe end. A valve is then passed over the tool to engage the pipe end. As the fluid is being diverted through the tool, the valve is then soldered to the pipe without concern for the heat sink effect of fluid passage through the pipe. Regardless of whether relatively large or small quantities of water remain in and/or are running through the pipe, a properly soldered joint is assured as the pipe end is insulated from fluid which is now running through the tool. Once the valve has been properly soldered to the pipe end, the tool is simply pulled through the valve and removed. The resilient member flexes to pass through the restriction within the valve and removal of tool is unhindered. After removal of the tool, the valve is closed and any other repairs are made to the pipe and the plumbing system. Capping of the pipe end is therefore rapidly achieved with minimal disruption to the users.

Another plumbing tool according to the present invention provides an elongated hollow shaft which is angled to provide access to difficult areas.

Another plumbing tool according to the present invention provides a container and is manufactured of materials resistant to hazardous materials.

Another plumbing tool according to the present invention provides removable head portions to simplify storage and transport of a multiple of such tools.

The present invention therefore provides a plumbing tool for the timely soldering of a fitting to a pipe even in the presence of water or hazardous liquid.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
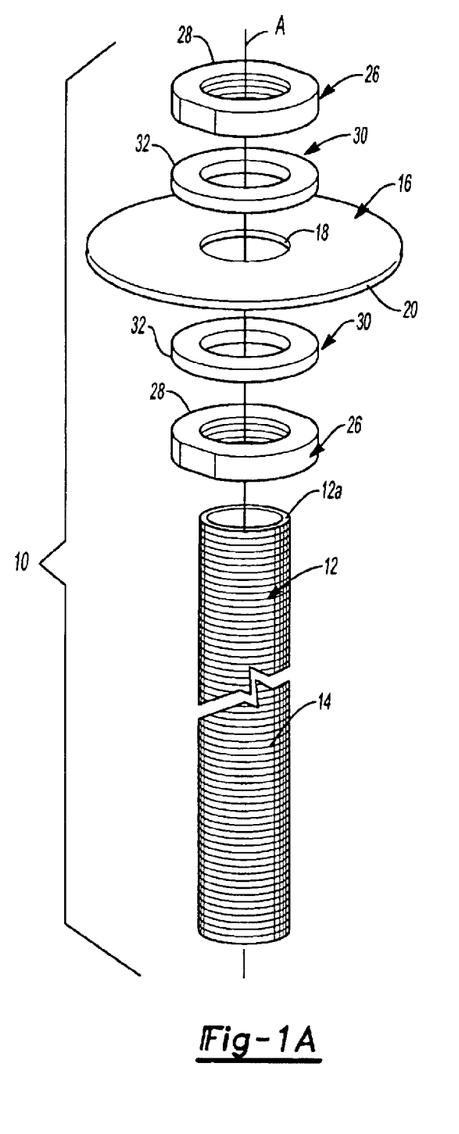
FIG. 1A is a general exploded view of a plumbing tool designed according to the present invention.

FIG. 1A illustrates a general perspective view of a plumbing tool 10. The tool 10 includes an elongated hollow shaft 12 which defines an axis A. The shaft 12 is preferably a threaded rod or other rigid or semi rigid member which provides an axial rigidity. It should be understood that the shaft 12 may be semi-flexible in that the shaft 12 may be flexible away form axis A while still providing axial rigidity in compression and extension along axis A.

The shaft 12 provides a non-slip outer surface 14 such as a threaded, knurled, or other irregular surface which improves handling of the tool 10. It should be understood that other griping surfaces or other extension which may extend off axis A will also benefit from the present invention.

A resilient member 16 is attached to the shaft 12 adjacent a shaft end 12a. Other mounting locations will also benefit from the present invention. The resilient member 16 extends radially outward relative the axis A. Preferably, the resilient member 16 is a substantially annular member which is manufactured of a rubber, plastic, or other flexible material. The resilient member 16 defines an inner diameter 18 which fits about the outer surface 14 of the shaft 12 and a resilient member outer diameter 20. The outer diameter 20 is sized to closely fit within a pipe inner diameter 22 of a pipe 24 (FIG. 2B) as will be further described.

The resilient member 16 is retained to the shaft 12 by a pair of threaded fasteners 26 which engage the outer surface 14. By providing an outer surface 14 which is threaded to receive the threaded fasteners 26, the outer surface operates both as a non-slip surface and as a receiver for the threaded fasteners 26 to thereby minimize machining operations on the tool 10. It should be understood that although threaded fasteners are disclosed in the illustrated embodiment, other attachment devices such as welding and the like will also benefit from the present invention.

Figure 1B:
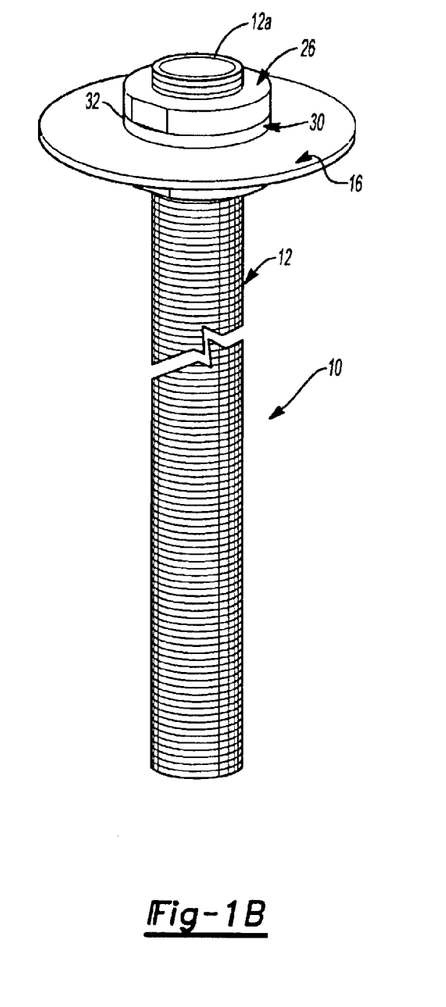
FIG. 1B is a general perspective view of the plumbing tool.

To minimize the possibility of damage to the resilient member 16, the threaded fasteners 26 include rounded outer surfaces 28. That is, the threaded fasteners 26 preferably avoid sharp contours which may damage the resilient member 16. To further protect the resilient member 16, a spacer 30 is preferably located between each threaded fastener 26 and the resilient member 16. Each spacer 30 is an annular member which is manufactured of a non-metallic material, such as Teflon, plastic or the like. The spacer 30 defines a spacer outer diameter 32 which is slightly larger than a threaded fastener outer diameter 34 to further isolate the resilient member 16 (FIG. 1B).

Figure 2A:
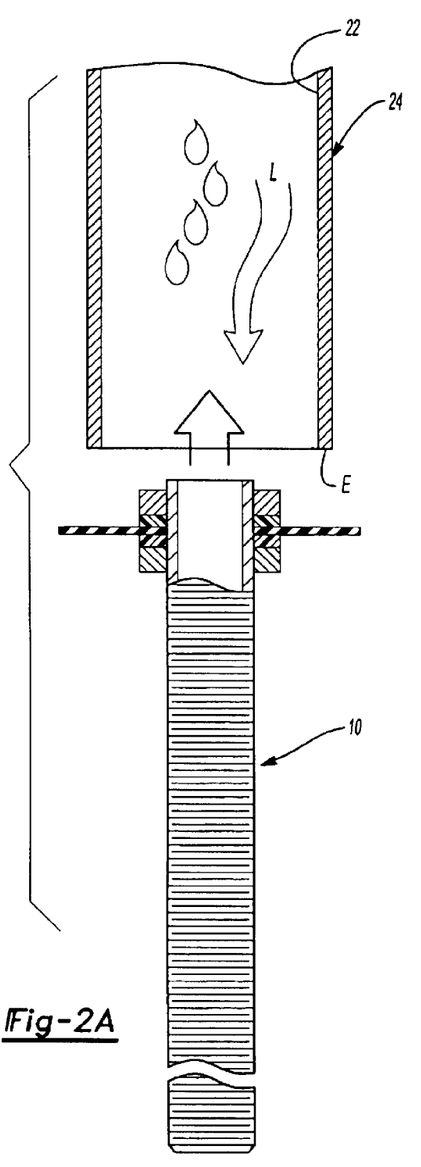
FIG. 2A is a sectional view of the plumbing tool in a first position relative to a pipe.

Referring to FIG. 2A, a method of using the toot 10 will be further disclosed. The pipe 24 is typically a water pipe in a residential structure, commercial structure, vehicle or other application in which the pipe may be manufactured of metallic material. Although the pipe 24 is disclosed in a particular orientation, it should be understood that the present invention is not to be so limited as the tool 10 operates effectively in any orientation. The pipe 24 is commonly of a ½ inch, ¾ inch or 1 inch diameter, however, the tool 10 may be provided for any desired diameter pipe by appropriate sizing.

As generally known, when a leak occurs, the pipe 24 is commonly cut to form an axial pipe end E. The pipe 24, however, may still be a conduit for fluid leakage L from a fluid source upstream of the pipe end E. Moreover, the fluid may be under a pressure which may result in a considerable fluid flow from pipe end E. The present invention provides for repair of the pipe 24 without the heretofore necessity of draining the entire fluid system.

The tool 10 is preferably sized to a particular pipe 24 and preferably includes a marking or color coding system which allow rapid identification, e.g., red for ½ inch, white for ¾ inch, and blue for a 1 inch diameter pipe. Other identification systems will also benefit from the present invention. The tool 10 is primarily sized by the outer diameter 20 of the resilient member 16 and the diameter of shaft 12. The resilient member 16 is sized to closely fit within the pipe inner diameter 22 to block fluid flow. The resilient member is also sized to assuring passage (due to its flexibility) through a restriction smaller than the pipe inner diameter 22 such as is common to a valve V such as a ball valve (FIG. 2E). The shaft 12 is sized to pass through the valve V (FIG. 2C) while providing fluid flow therethrough. Generally, the larger the pipe 24, the larger the shaft 12.

Figure 2B:
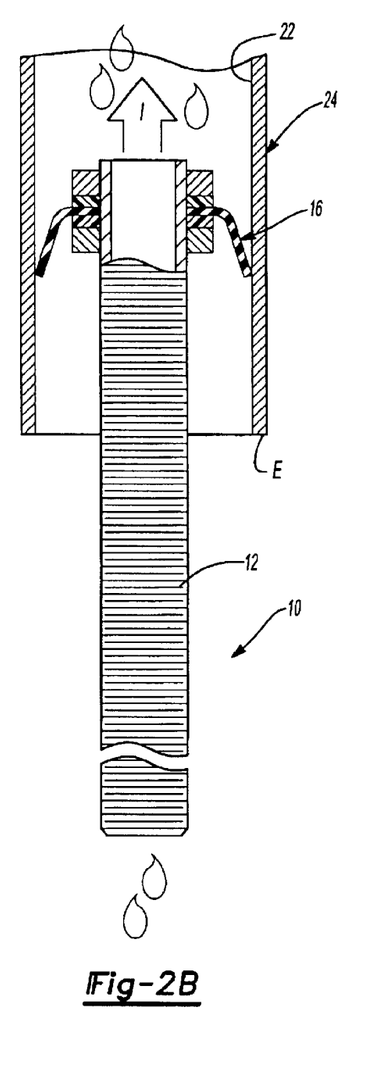
FIG. 2B is a sectional view of the plumbing tool inserted into a pipe.

Referring to FIG. 2B, once the pipe 24 has been cut, the tool 10 is forced into the pipe end E (schematically illustrated by arrow I). The resilient member 16 closely fits within the pipe inner diameter 22 to block fluid flow. As the shaft 12 is hollow, fluid flow is diverted through the shaft 12. Pressure that may otherwise form upstream of the resilient member 16 is thereby substantial alleviated. Moreover, as the fluid is diverted through the shaft 12, insertion of the tool 10 within the pipe 24 requires relatively little effort. Further, as the tool 10 is being inserted, the resilient member 16 may form a funnel like shape which assists in essentially swabbing the pipe inner diameter 22 to minimize residual fluid adjacent the pipe end E.

Figure 2C:
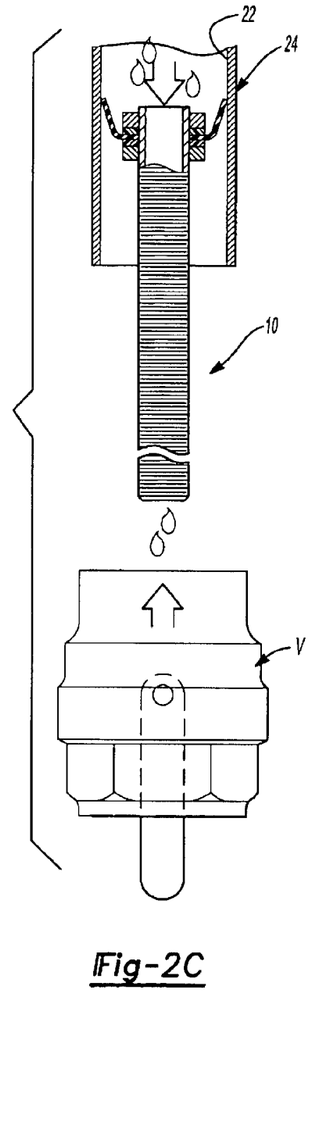
FIG. 2C is a sectional view of the plumbing tool in a third position with a valve adjacent the pipe.
Figures 2D, 2E:
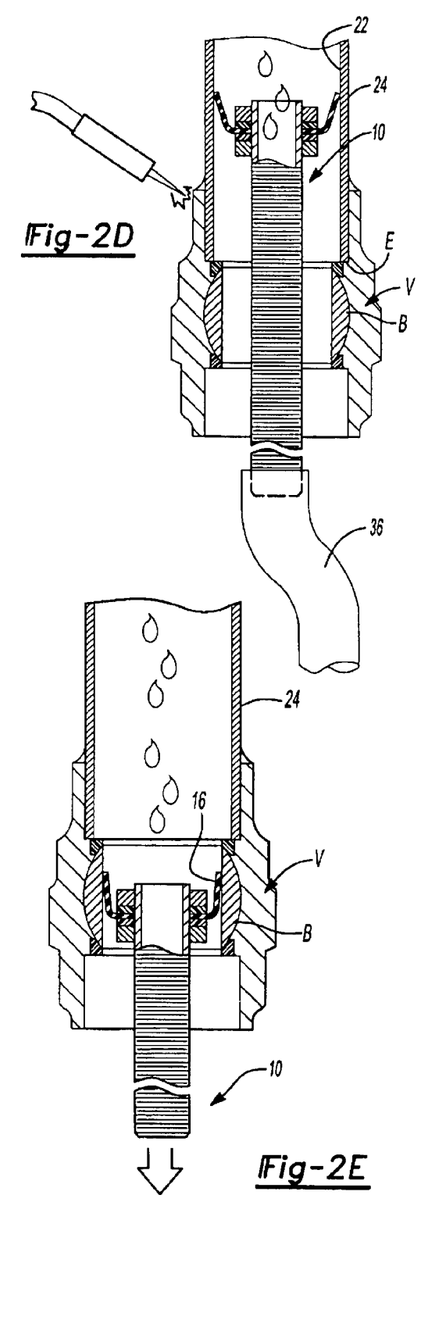
FIG. 2D is a sectional view of the plumbing tool with a valve soldered to the pipe.
FIG. 2E is a sectional view of the plumbing tool being removed through the soldered valve.

Referring to FIG. 2C, once the tool 10 has been inserted into the pipe 24, fluid is redirected away from the pipe inner diameter 22 adjacent the pipe end E. Due to fluid flow or by slightly pulling on the tool 10 opposite the direction of insertion the resilient member 16 may form a slightly conically or funnel like shape within the pipe 24 opposite that in FIG. 2B. The funnel like shape improves direction of fluid into the shaft 12 and assists in sealing the tool to the inner diameter 22 of the pipe 24. It should be understood, however, that the resilient member 16 is not to be limited to only a member which provides such a funnel-like forming shape and resilient members of minimal flexibility will also benefit from the present invention.

Figure 4:
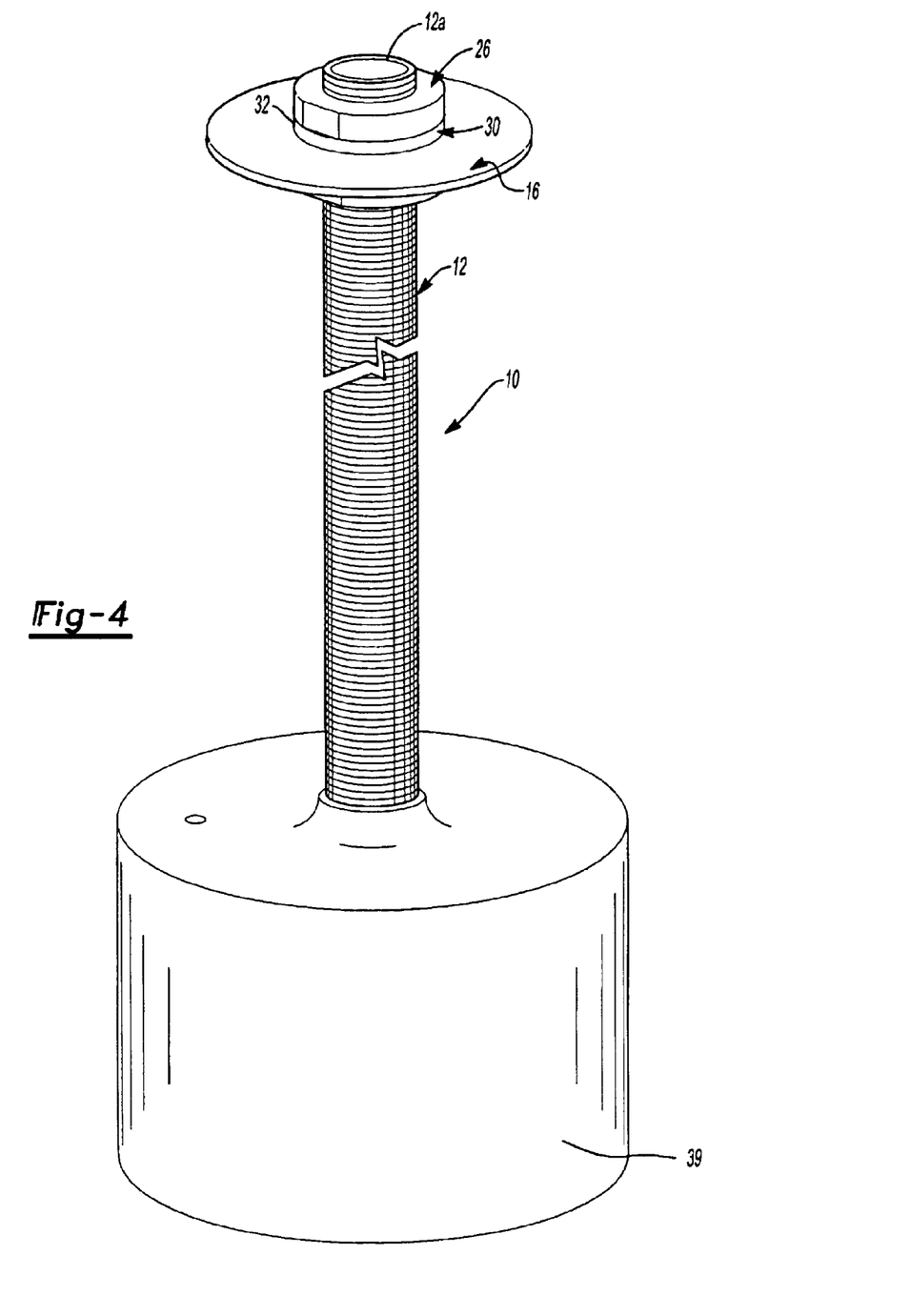
FIG. 4 is a general perspective view of another plumbing tool.

The valve V is then passed over the tool 10 to engage the pipe end E (FIG. 2D). As the fluid is being diverted through the tool 10, the valve V is then soldered to the pipe 24 without concern for the heat sink effect of fluid passage through the pipe 24. Regardless of whether relatively large or small quantities of water remain in and/or are running through the pipe 24, a properly soldered joint is assured as the pipe end E and valve V interface is insulated from fluid which is now running through the tool 10. For further convenience, a hose 36 may be connected to an end of the shaft 12 opposite the flexible member 16. The hose 36 provides for additional flexibility in the redirection of the fluid, such as to a bucket or drain. In another arrangement, a container 39 (FIG. 4) is mountable directly to the end of the shaft 12 in a manner similar to the hose 36. Preferably, components of the tool 10 are manufactured of a material which resists hazardous fluids such as fuels and other corrosive fluids. The container 39 is preferably utilized to receive fluids which may have disadvantageous consequences if disposed of into a drain.

Figure 3:
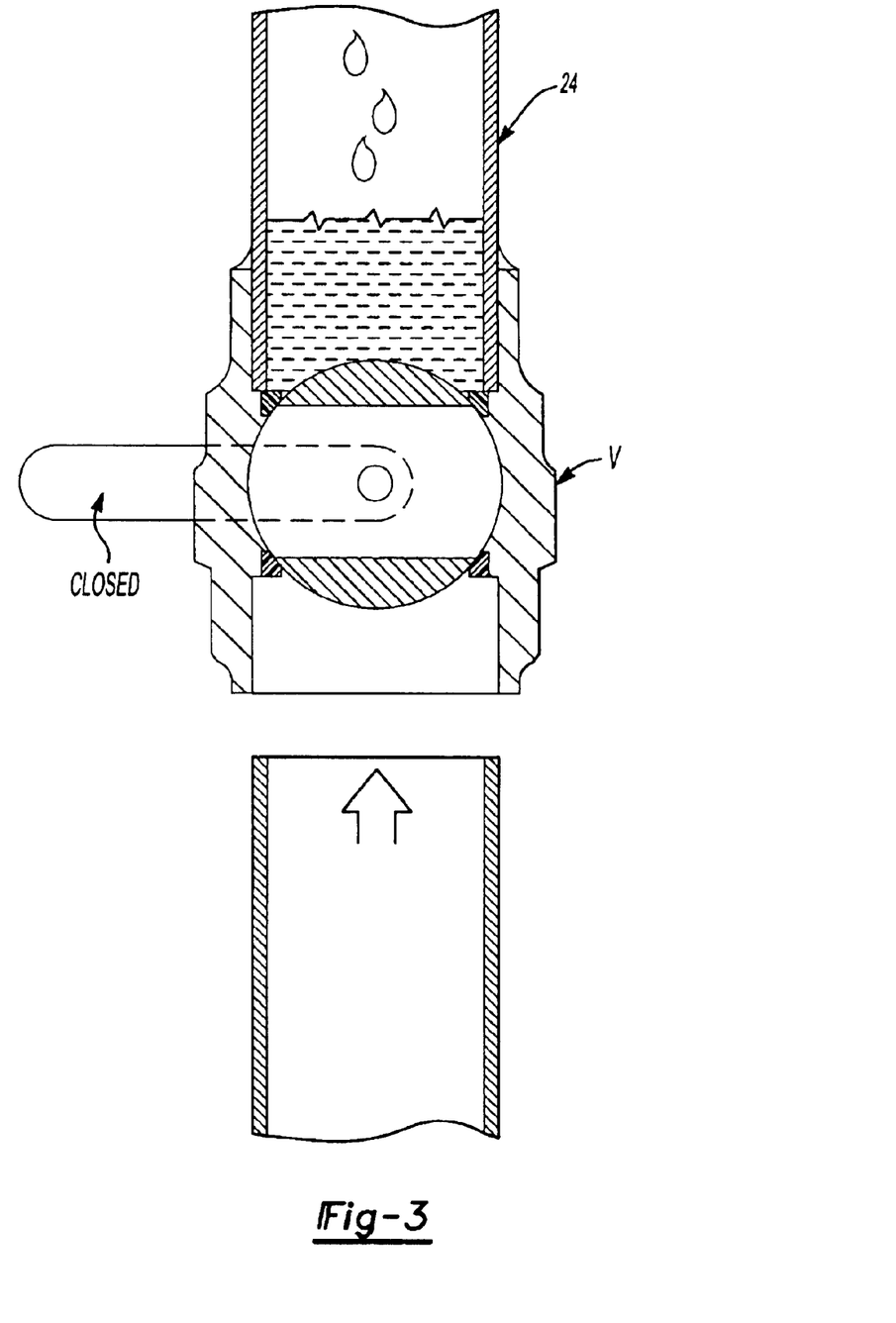
FIG. 3 is a sectional view of the repaired pipe.

Referring to FIG. 2D, valve V such as ball valves typically include a movable portion, such as a rotating ball B that opens and closes the valve. The ball B is a restriction which is smaller than the piper inner diameter 22. Once the valve V has been properly soldered to the pipe end E, the tool 10 is simply pulled through the valve V and removed (FIG. 2E). The resilient member 16 simply flexes to pass through the restriction and removal of tool 10 is unhindered. After removal of the tool 10, the valve V is closed and any other repairs are made to the pipe 24 and the plumbing system (FIG. 3). The capping of the pipe end E with the valve V is therefore rapidly achieved with minimal disruption to the users.

The present invention also operates with non-metallic pipes which must be attached together with an adhesive. Although the adhesive commonly adheres in the presence of some fluid, the removal of fluid adjacent the joint is preferred. The swabbing action of the tool 10 during insertion (FIG. 2B) and the diversion of fluid away from the setting adhesive is therefore particularly beneficial.

Figure 5:
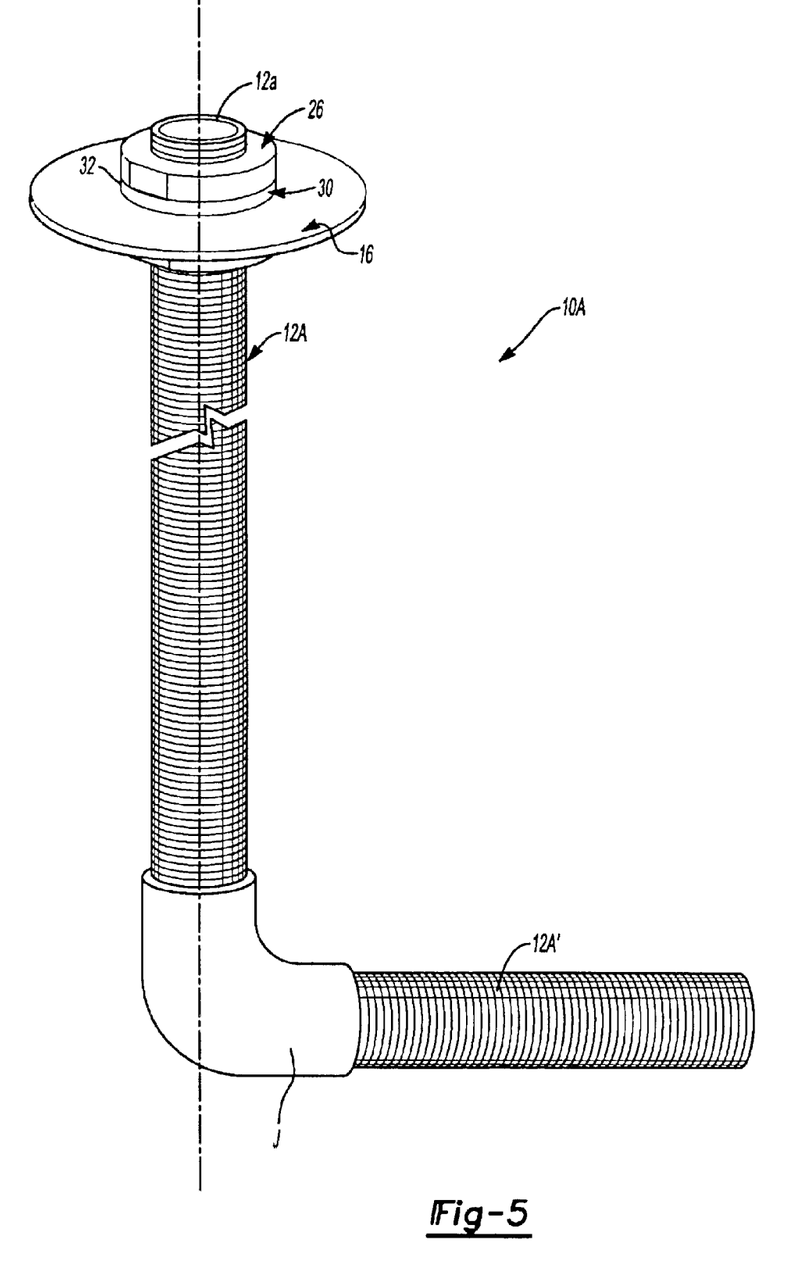
FIG. 5 is a general perspective view of another plumbing tool.

Referring to FIG. 5, another plumbing tool 10A includes an elongated hollow shaft 12A which includes an angled portion 12A' which is angled off the axis A. The angled portion 12A' simplifies reaching otherwise inaccessible areas common in plumbing work. It should be understood that any angle will benefit from the present invention and the angle is not to be limited to the ninety degree bend as disclosed in the illustrated embodiment. It should be further understood that a joint J may be utilized to mount the angled portion 12A' or the like.

Figure 6:
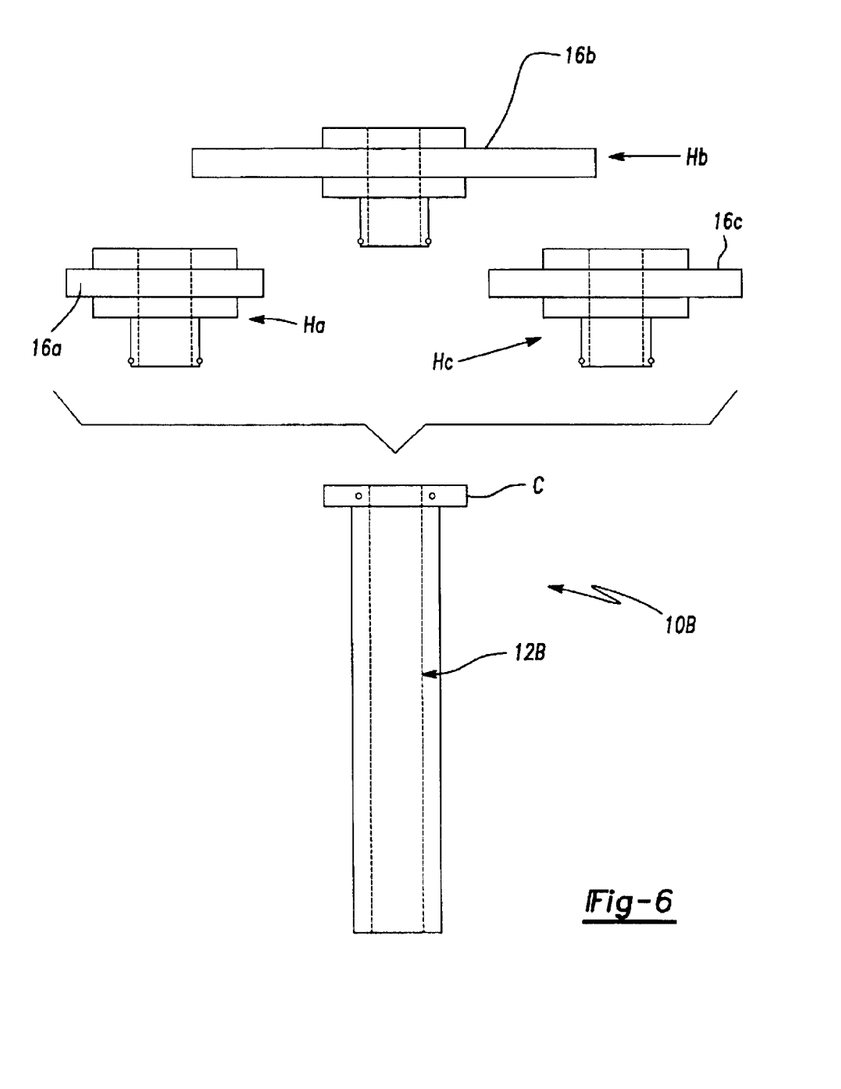
FIG. 6 is a general perspective view of another plumbing tool.

Referring to FIG. 6, another plumbing tool 10B includes an elongated hollow shaft 12B which includes a removable head portion H. The head portion H is replaceable such that each head portion H supports a resilient member 16a-16c of a particular size. That is, one of a multiple of head portions H are selectively mounted to the shaft 12B through a connection area C such as a threaded connection, snap locks and/or other engagements which provides for a multiple of pipe diameters. Such an arrangement minimizes space requirements within a toolbox or the like by avoiding the necessity of carrying a plurality of relatively long handled tools.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of the invention. It is, therefore, to be understood that within the scope of the appended claims, the invention may be practiced otherwise than as specifically described. For that reason the following claims should be studied to determine the true scope and content of this invention.

What is claimed is:

1. A plumbing tool for repairing a pipe comprising:
    an unobstructed hollow shaft member which comprises a first portion which defines a first axis and a second portion angled off said first axis; and
    a resilient member mounted to said hollow shaft member, said resilient member extending radially relative to said first axis, said resilient member flexible toward said unobstructed hollow shaft during insertion into the pipe and at least partially invertible in response to a retraction of the unobstructed hollow shaft member toward the open end of the pipe to provide a close sealing fit within a portion of the pipe inner diameter to a direct fluid flow into said unobstructed hollow shaft member and having a flexibility to pass through a controllable second inner diameter less than said pipe inner diameter.

2. The plumbing tool as recited in claim 1, further comprising a container selectively mountable to said hollow shaft.

3. The plumbing tool as recited in claim 1, further comprising a head portion which supports said resilient member, said head portion selectively mountable to said hollow shaft member.

4. The plumbing tool as recited in claim 1, wherein said resilient member is manufactured of a hazardous resistant material.

5. The plumbing tool as recited in claim 1, wherein said resilient member is flexible toward the unobstructed hollow shaft to provide a swabbing action during insertion into the pipe and is flexible away from said unobstructed hollow shaft to provide a swabbing action of said controllable second inner diameter during extraction.

6. The plumbing tool as recited in claim 2, wherein said container hangs from said hollow shaft.

7. The plumbing tool as recited in claim 6, wherein said container is a bottle.

8. The plumbing tool as recited in claim 2, wherein said container engages a threaded surface on said hollow shaft.

9. The plumbing tool as recited in claim 3, further comprising a snap lock which selectively mounts one of a multiple of head portions to said hollow shaft member.

10. The plumbing tool as recited in claim 1, further comprising an angled portion engageable with said unobstructed hollow shaft.

11. The plumbing tool as recited in claim 10, wherein said angled portion is angled at approximately ninety degrees.

12. The plumbing tool as recited in claim 1, wherein said resilient member extending radially relative to said first axis to define the outermost radial outer dimension of the plumbing tool.

13. The plumbing tool as recited in claim 1, wherein said resilient member is a generally planar member which extends transverse to said first axis.

14. The plumbing tool as recited in claim 1, wherein said unobstructed hollow shaft member is rigid.

15. The plumbing tool as recited in claim 14, wherein said resilient member is axially retained to said unobstructed hollow shaft member between a pair of threaded fasteners.

16. A plumbing tool for repairing a pipe comprising:
    an unobstructed hollow shaft member which includes a first portion which defines a first axis and a second portion angled off said first axis, said unobstructed hollow shaft member having a threaded outer surface;
    a resilient member mounted to said hollow shaft member, said resilient member extending radially relative to said first axis, said resilient member flexible toward said unobstructed hollow shaft during insertion into the pipe and at least partially invertible in response to a retraction of the unobstructed hollow shaft member toward the open end of the pipe to provide a close sealing fit within a portion of the pipe inner diameter to direct a fluid flow into said unobstructed hollow shaft member and having a flexibility to pass through a controllable second inner diameter less than said pipe inner diameter; and a closed container removably engageable with said threaded outer surface to receive fluid from within said unobstructed hollow shaft member.

17. The plumbing tool as recited in claim 16, wherein said container hangs from said hollow shaft.

18. The plumbing tool as recited in claim 16, further comprising an angled portion engageable with said threaded outer surface.

19. The plumbing tool as recited in claim 18, wherein said angled portion is angled at approximately ninety degrees.

20. The plumbing tool as recited in claim 18, further comprising a second elongated hollow portion engageable with said angled portion.

21. The plumbing tool as recited in claim 16, wherein said resilient member extending radially relative to said first axis to define the outermost radial outer dimension of the plumbing tool.

22. The plumbing tool as recited in claim 16, wherein said resilient member is a generally planar member which extends transverse to said first axis.

23. The plumbing tool as recited in claim 16, wherein said unobstructed hollow shaft member is rigid.

24. The plumbing tool as recited in claim 23, wherein said resilient member is axially retained to said unobstructed hollow shaft member between a pair of threaded fasteners.

* * * * *